(12) United States Patent
Ota et al.

(10) Patent No.: US 9,014,850 B2
(45) Date of Patent: Apr. 21, 2015

(54) METHODS AND COMPUTER-PROGRAM PRODUCTS FOR EVALUATING GRASP PATTERNS, AND ROBOTS INCORPORATING THE SAME

(75) Inventors: Yasuhiro Ota, Union, KY (US); Junggon Kim, Pittsburgh, PA (US); James J. Kuffner, Mountain View, CA (US)

(73) Assignees: Toyota Motor Engineering & Manufacturing North America, Inc., Erlanger, KY (US); Carnegie Mellon University, Pittsburgh, PA (US)

( * ) Notice: Subject to any disclaimer, the term of this patent is extended or adjusted under 35 U.S.C. 154(b) by 532 days.

(21) Appl. No.: 13/350,245

(22) Filed: Jan. 13, 2012

(65) Prior Publication Data

US 2013/0184860 A1    Jul. 18, 2013

(51) Int. Cl.
*G06F 19/00* (2011.01)
*B25J 9/16* (2006.01)

(52) U.S. Cl.
CPC .............. *B25J 9/1612* (2013.01); *B25J 9/1669* (2013.01); *G05B 2219/39476* (2013.01); *G05B 2219/39536* (2013.01); *G05B 2219/39546* (2013.01); *G05B 2219/40411* (2013.01); *G05B 2219/45084* (2013.01)

(58) Field of Classification Search
CPC ............. B25J 13/08; B25J 9/16; B25J 9/1612
USPC .................................................. 700/245–264
See application file for complete search history.

(56) References Cited

U.S. PATENT DOCUMENTS

| | | |
|---|---|---|
| 3,985,238 A | 10/1976 | Nakura et al. |
| 4,300,198 A | 11/1981 | Davini |
| 4,308,584 A | 12/1981 | Arai et al. |
| 4,530,636 A | 7/1985 | Inaba et al. |
| 4,550,383 A | 10/1985 | Sugimoto |
| 4,633,385 A | 12/1986 | Murata et al. |
| 4,762,455 A | 8/1988 | Coughlan et al. |
| 4,974,210 A | 11/1990 | Lee |

(Continued)

OTHER PUBLICATIONS

Andrew T. Miller and Peter K. Allen, GraspIt! A Versatile Simulator for Robotic Grasping, IEEE Robotics & Automation Magazine, Dec. 2004.

(Continued)

*Primary Examiner* — Jason Holloway
*Assistant Examiner* — Rachid Bendidi
(74) *Attorney, Agent, or Firm* — Dinsmore & Shohl LLP

(57) ABSTRACT

Methods and computer-program products for evaluating grasp patterns for use by a robot are disclosed. In one embodiment, a method of evaluating grasp patterns includes selecting an individual grasp pattern from a grasp pattern set, establishing a thumb-up vector, and simulating the motion of the manipulator and the end effector according to the selected individual grasp pattern, wherein each individual grasp pattern of the grasp pattern set corresponds to motion for manipulating a target object. The method further includes evaluating a direction of the thumb-up vector during at least a portion of the simulated motion of the manipulator and the end effector, and excluding the selected individual grasp pattern from use by the robot if the direction of the thumb-up vector during the simulated motion is outside of one or more predetermined thresholds. Robots utilizing the methods and computer-program products for evaluating grasp patterns are also disclosed.

16 Claims, 4 Drawing Sheets

(56) References Cited

U.S. PATENT DOCUMENTS

| | | | |
|---|---|---|---|
| 4,980,626 A * | 12/1990 | Hess et al. | 318/568.16 |
| 4,990,838 A | 2/1991 | Kawato et al. | |
| 5,023,808 A | 6/1991 | Seraji | |
| 5,038,089 A | 8/1991 | Szakaly | |
| 5,325,468 A * | 6/1994 | Terasaki et al. | 700/262 |
| 5,336,982 A | 8/1994 | Backes | |
| 6,580,970 B2 | 6/2003 | Matsuda et al. | |
| 6,954,681 B2 | 10/2005 | Fisher et al. | |
| 6,969,965 B2 | 11/2005 | Takenaka et al. | |
| 7,155,316 B2 | 12/2006 | Sutherland et al. | |
| 7,211,978 B2 | 5/2007 | Chang et al | |
| 7,245,975 B2 | 7/2007 | Mirza | |
| 7,386,365 B2 | 6/2008 | Nixon | |
| 7,571,025 B2 | 8/2009 | Bischoff | |
| 7,592,768 B2 | 9/2009 | Shirai et al. | |
| 7,751,938 B2 * | 7/2010 | Tsusaka et al. | 700/250 |
| 7,774,099 B2 | 8/2010 | Kobayashi et al. | |
| 7,848,851 B2 * | 12/2010 | Nishi et al. | 700/264 |
| 8,244,402 B2 * | 8/2012 | Wells et al. | 700/250 |
| 2006/0012198 A1 * | 1/2006 | Hager et al. | 294/106 |
| 2007/0219668 A1 | 9/2007 | Takahashi et al. | |
| 2008/0075561 A1 | 3/2008 | Takemura et al. | |
| 2008/0249663 A1 | 10/2008 | Aoyama | |
| 2009/0069942 A1 | 3/2009 | Takahashi | |
| 2009/0148035 A1 | 6/2009 | Ohno et al. | |
| 2010/0138039 A1 | 6/2010 | Moon et al. | |
| 2010/0256818 A1 * | 10/2010 | Aoba et al. | 700/275 |
| 2011/0093119 A1 | 4/2011 | Park et al. | |
| 2011/0153076 A1 | 6/2011 | Noro | |
| 2013/0184870 A1 * | 7/2013 | Ota et al. | 700/262 |

OTHER PUBLICATIONS

Corey Goldfeder, Matei Ciocarlie, Hao Dang and Peter K. Allen, The Columbia Grasp Database, authors are with the Dept. of Computer Science, Columbia University, NY, USA.

Kaijen Hsiao, Matei Ciocarlie, and Peter Brook, Bayesian Grasp Planning, Willow Garage Inc., Menlo Park, CA.

European Search Report issued in corresponding application 13151028.1, dated Jun. 18, 2014.

Alcazar et al, Dexterous Robotic Hand Grasping Method for Automotive Parts, 2010 IEEE-RAS International Conference on Humanoid Robots, Nashville, TN, USA, Dec. 2010, pp. 282-287.

Ekvall et al, Learning and Evaluation of the Approach Vector for Automatic Grasp Generation and Planning, 2007 IEEE International Conference on Robotics and Automaton, Roma, Italy, Apr. 10-14, 2007, pp. 4715-4720.

* cited by examiner

METHODS AND COMPUTER-PROGRAM PRODUCTS FOR EVALUATING GRASP PATTERNS, AND ROBOTS INCORPORATING THE SAME

TECHNICAL FIELD

The present disclosure generally relates to robot grasping and trajectory planning and, more particularly, to robots, methods and computer-program products for evaluating grasp patterns of a grasp pattern set to remove grasp patterns that may yield unnatural movement by the robot.

BACKGROUND

Robots may operate within a space to perform particular tasks. For example, servant robots may be tasked with navigating within an operational space, locating objects, and manipulating objects. A robot may be commanded to find an object within the operating space, pick up the object, and move the object to a different location within the operating space. Robots are often programmed to manipulate objects quickly and in a most efficient way possible. However, the quickest and most efficient movement of the robot may not be the most ideal, particularly for servant robots that assist humans (e.g., in the home, healthcare facilities, and the like). In some instances, the robot may grasp the object in a manner that a person would not or could not perform. For example, the robot may twist its hand to grasp the object with its thumb joint facing outwardly. A person would not attempt to grasp an object in this manner. An observer of the robot that grasps objects in such an unnatural way may be frightened or wary of the robot. Additionally, observers within the same operating space may not expect the robot to move its arms in an unnatural manner, such as by extending its elbow outwardly and upwardly.

Accordingly, a need exists for alternative methods and computer-program products for evaluating grasp patterns of a grasp pattern set to filter out undesirable grasp patterns, as well as robots that move in a natural, human-like manner.

SUMMARY

In one embodiment, a method of evaluating individual grasp patterns of a grasp pattern set for use by a robot includes selecting an individual grasp pattern from the grasp pattern set, establishing a thumb-up vector extending from a top surface of the end effector, and simulating the motion of the manipulator and the end effector according to the selected individual grasp pattern, wherein each individual grasp pattern of the grasp pattern set corresponds to a motion of the manipulator and the end effector of the robot for manipulating a target object. The method further includes evaluating a direction of the thumb-up vector during at least a portion of the simulated motion of the manipulator and the end effector, and excluding the selected individual grasp pattern from use by the robot if the direction of the thumb-up vector during the simulated motion is outside of one or more predetermined thresholds.

In another embodiment, a computer-program product for use with a computing device for evaluating individual grasp patterns of a grasp pattern set for use by a robot includes a computer-readable medium storing computer-executable instructions for evaluating grasp patterns. The computer-executable instructions, when executed by the computing device, cause the computing device to select an individual grasp pattern from the grasp pattern set, establish a thumb-up vector extending from a top surface of the end effector, and simulate the motion of the manipulator and the end effector according to the selected individual grasp pattern, wherein each individual grasp pattern of the grasp pattern set corresponds to a motion of the manipulator and the end effector of the robot for manipulating a target object. The computer executable instructions further cause the computing device to evaluate a direction of the thumb-up vector during at least a portion of the simulated motion of the manipulator and the end effector, and exclude the selected individual grasp pattern from use by the robot if the direction of the thumb-up vector during the simulated motion is outside of one or more predetermined thresholds.

In yet another embodiment, a robot includes a base portion having a base surface, a manipulator movably coupled to the base portion, an end effector movably coupled to a distal end of the manipulator, a processor, and a computer-readable medium storing computer-executable instructions for evaluating grasp patterns. When executed by the processor, the computer-executable instructions cause the processor to receive one or more grasp pattern candidates, select one of the one or more grasp pattern candidates and provide the selected grasp pattern candidate to a motion planner module, generate a plurality of motion segments corresponding to the base portion, the manipulator, the end effector or combinations thereof, and control the base portion, the manipulator, or the end effector according to the plurality of motion segments. The grasp pattern candidates are generated by selecting an individual grasp pattern from a grasp pattern set, establishing a thumb-up vector extending from a top surface of the end effector, and simulating the motion of the manipulator and the end effector according to the selected individual grasp pattern, wherein each individual grasp pattern of the grasp pattern set corresponds to a motion of the manipulator and the end effector of the robot for manipulating a target object. The grasp pattern candidates are further generated by evaluating a direction of the thumb-up vector during at least a portion of the simulated motion of the manipulator and the end effector, and excluding the selected individual grasp pattern from use by the robot if the direction of the thumb-up vector during the simulated motion is outside of one or more predetermined thresholds.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to methods, computer-program products and robots that provide for natural, human-like movement of robot manipulators and end effectors. More particularly, embodiments are directed to controlling a robot having at least one manipulator and at least one end effector in a natural, human-like manner so that the actions of the robot may appear to be more pleasing to observers of the robot. As an example and not a limitation, in an action requiring the robot to pick up and move a target object, such as a cup of coffee, a non-optimized robot may grasp the cup of coffee and pick it up such that the top of the coffee cup is upside down and the coffee is spilled from the cup. Further, the non-optimized robot may also unnaturally lift and extend its elbow outwardly, which may be unexpected to an observer and may cause collisions between the robot and the user or an obstacle. As described in detail below, embodiments may utilize a thumb-up vector to ensure that the robot manipulates the target object in a manner that is both expected and appealing to observers of the robot. Various embodiments of robots, methods and computer-program products of evaluating individual grasp patterns of a grasp pattern set for use by a robot are described below.

Figure 1:
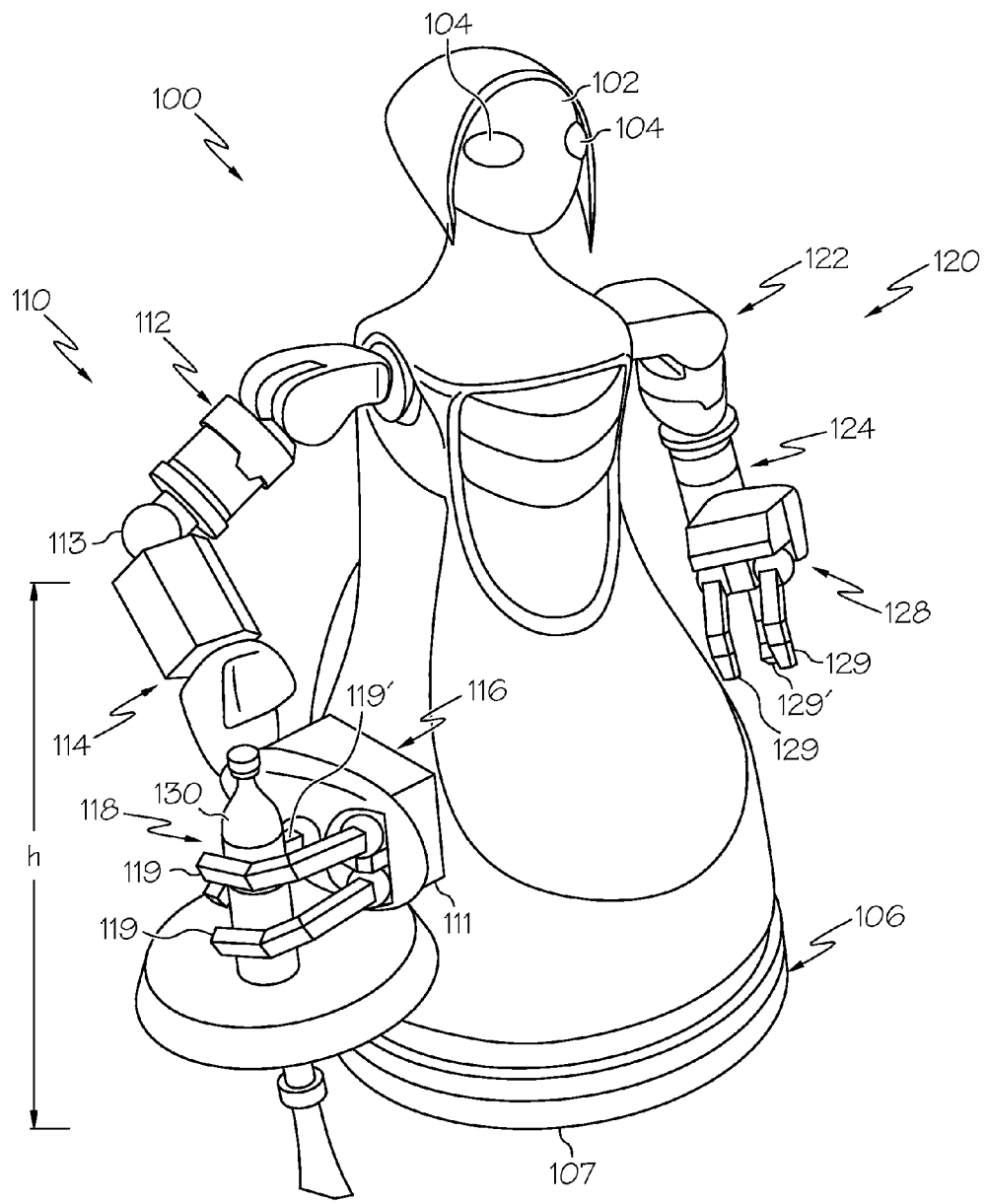
FIG. 1 depicts a schematic illustration of an exemplary robot manipulating a target object.

Referring initially to FIG. 1, a non-optimized robot 100 according to one exemplary embodiment is illustrated. It should be understood that the robot 100 illustrated in FIG. 1 is for illustrative purposes only, and that embodiments are not limited to any particular robot configuration. The robot 100 has a humanoid appearance and is configured to operate as a service robot. For example, the robot 100 may operate to assist users in the home, in a nursing care facility, in a healthcare facility, and the like. Generally, the robot 100 comprises a head 102 with two cameras 104 that are configured to look like eyes, a locomotive base portion 106 for moving about in an operational space, a first manipulator 110, and a second manipulator 120. The first and second manipulators 110, 120 each comprise an upper arm component 112, 122, a forearm component 114, 124, and a hand component 118, 128 (i.e., an end effector), respectively. The hand component 118, 128 may comprise a robot hand comprising a hand portion 116, 126, a plurality of fingers joints 119, 129, and a thumb joint 119', 129' that may be opened and closed to manipulate a target object, such as a bottle 130. The upper arm component 112, 122, the forearm component 114, 124, and hand component 118, 128 are each a particular component type of the first and second manipulator.

The robot 100 may be programmed to operate autonomously or semi-autonomously within an operational space, such as a home. In one embodiment, the robot 100 is programmed to autonomously complete tasks within the home throughout the day, while receiving audible (or electronic) commands from the user. For example, the user may speak a command to the robot 100, such as "please bring me the bottle on the table." The robot 100 may then go to the bottle 130 and complete the task. In another embodiment, the robot 100 is controlled directly by the user by a human-machine interface, such as a computer. The user may direct the robot 100 by remote control to accomplish particular tasks. For example, the user may control the robot 100 to approach a bottle 130 positioned on a table 132. The user may then instruct the robot 100 to pick up the bottle 130. The robot 100 may then develop a trajectory plan for its first and second manipulators 110, 120 to complete the task. As described in more detail below, embodiments are directed to creating trajectory plans that are optimized to provide for more human-like motion of the robot.

The robot 100 depicted in FIG. 1 is grasping the bottle 130 in an unnatural manner by twisting its hand component 118 upside down such that a top surface 111 of the hand portion 116 faces the ground, and the hand component 118 is positioned between the bottle 130 and the base portion 106. The grasp of the robot 100 depicted in FIG. 1 is not how a person would naturally attempt to pick up a similar bottle or other object. A high likelihood exists that the robot 100 will position the bottle 130 in an upside-down orientation when completing a trajectory plan to move the bottle 130. It is also noted that the grasping pattern of the robot 100 depicted in FIG. 1 requires that the robot lift its elbow 113 upwardly and outwardly, which may cause an unnecessary collision between the robot's elbow 113 and an obstacle. The unnatural position of the robot's elbow 113 may also contribute to an extreme orientation of the target object (e.g., the bottle 130). For example, the target object may be positioned at a large angle with respect to a vertical orientation.

Figure 2:
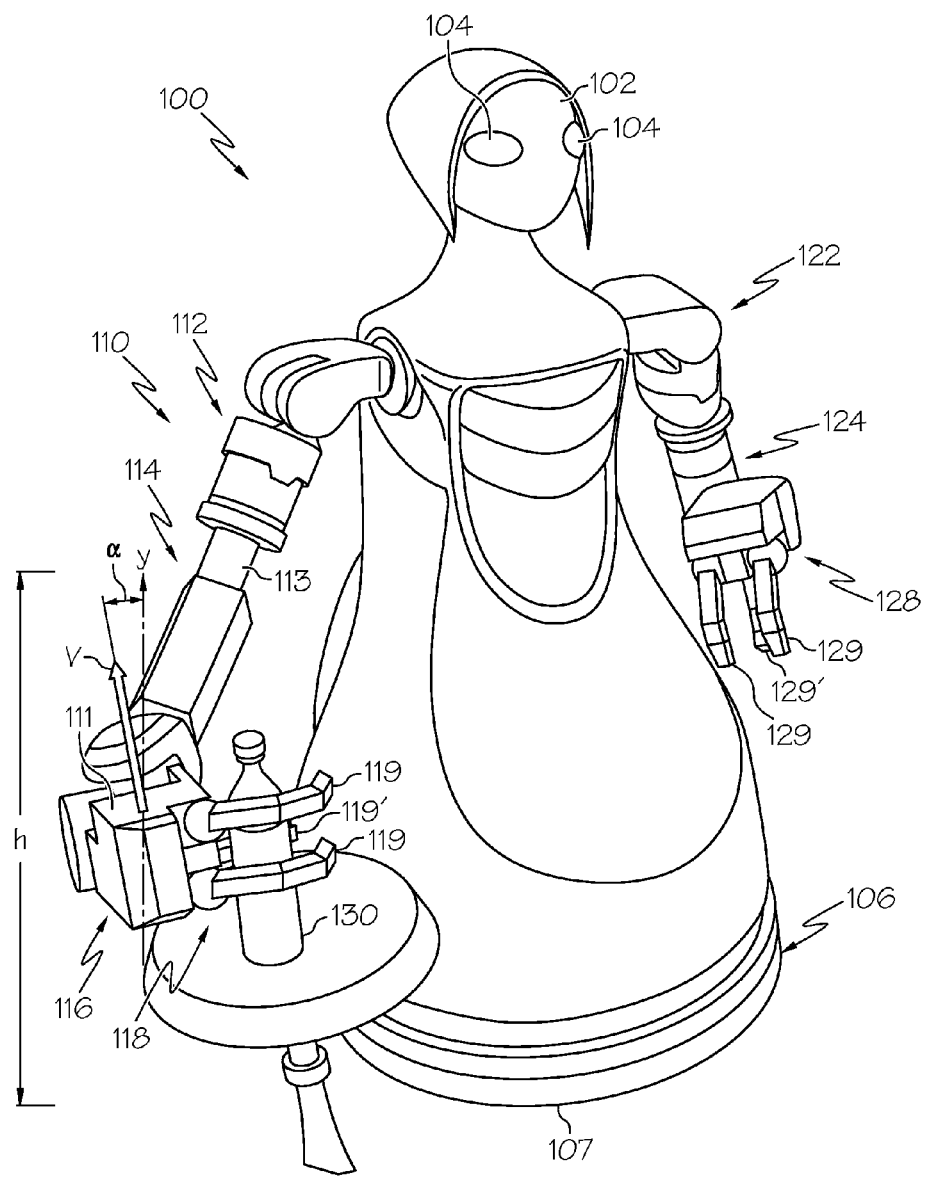
FIG. 2 depicts a schematic illustration of an exemplary robot manipulating a target object according to one or more embodiments shown and described herein.

Referring now to FIG. 2, the robot 100 is schematically depicted as grasping the bottle 130 in a more natural, human-like manner than as depicted in FIG. 1, according to one or more embodiments described herein. The top surface 111 of the hand portion faces generally upward, as how a person would grasp a bottle. Further, the elbow 113 is lower and closer to the base portion 106 than the position of the elbow in FIG. 1. With the grasp depicted in FIG. 2, the robot 100 is much less likely to orient the bottle (or other target object) upside-down, or at an extreme angle with respect to vertical.

As described in more detail below, embodiments of the present disclosure filter out grasp patterns of a grasp pattern set that may cause the robot to grasp an object in an unnatural manner. The grasp pattern set may comprise a plurality of individual grasp patterns, as there are many motions a robot may take to accomplish the same task (e.g., picking up a target object, such as a bottle). As non-limiting examples, one individual grasp pattern of the grasp pattern set may cause the robot 100 to pick up the bottle 130 as depicted in FIG. 1, another individual grasp pattern may cause the robot 100 to pick up the bottle 130 as depicted in FIG. 2, and yet another individual grasp pattern may cause the robot 100 to pick up a bottle 130 from the cap portion, etc. Embodiments described herein remove undesirable grasp patterns from the grasp pattern set such that the robot 100 does not consider these undesirable grasp patterns in online motion planning.

Figure 3:
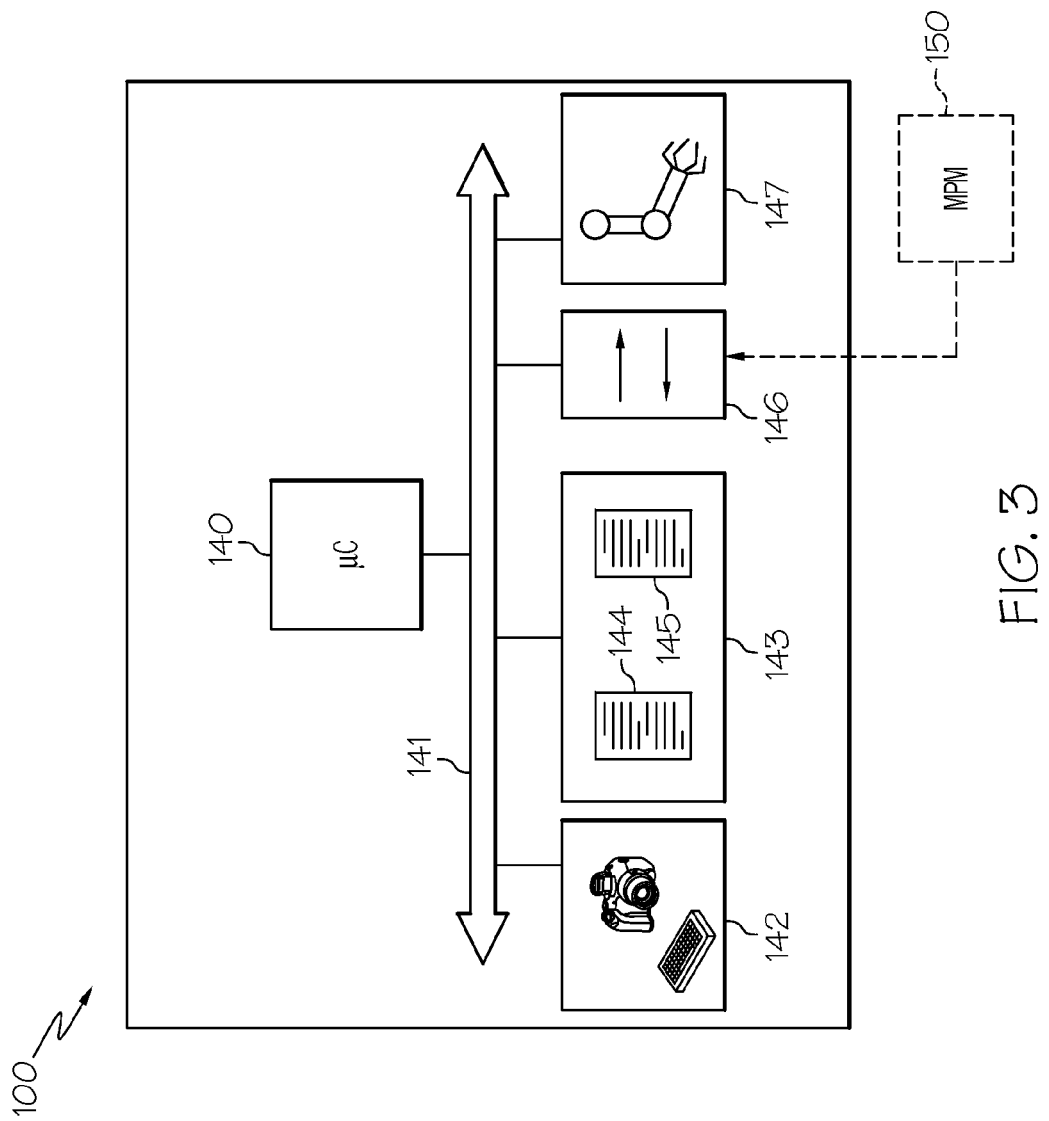
FIG. 3 depicts a schematic illustration of additional exemplary components of an exemplary robot according to one or more embodiments shown and described herein.

Referring now to FIG. 3, additional components of an exemplary robot 100 are illustrated. More particularly, FIG. 3 depicts a robot 100 and a manipulation planning module 150 (embodied as a separate computing device, an internal component of the robot 100, and/or a computer-program product comprising non-transitory computer-readable medium) for evaluating and generating grasp patterns for use by the robot 100 embodied as hardware, software, and/or firmware, according to embodiments shown and described herein. It is noted that the computer-program products and methods for evaluating individual grasp patterns of a grasp pattern set may be executed by a computing device that is external to the robot 100 in some embodiments. For example, a general purpose computer (not shown) may have computer-executable instructions for evaluating individual grasp patterns. The grasp patterns that satisfy requirements of the grasp pattern evaluation may then be sent to the robot 100.

The robot 100 illustrated in FIG. 3 comprises a processor 140, input/output hardware 142, a non-transitory computer-readable medium 143 (which may store robot data/logic 144, and trajectory logic 145, for example), network interface hardware 146, and actuator drive hardware 147 to actuate the robot's manipulators (e.g., servo drive hardware). It is noted that the actuator drive hardware 147 may also include associated software to control the various actuators of the robot.

The memory component 143 may be configured as volatile and/or nonvolatile computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 143 may be configured to store, among other things, robot data/logic 144 and trajectory logic 145 (e.g., an inverse kinematic module, a pick and place planner, a collision checker, etc.), as described in more detail below. A local interface 141 is also included in FIG. 3 and may be implemented as a bus or other interface to facilitate communication among the components of the robot 100 or the computing device.

The processor 140 may include any processing component configured to receive and execute instructions (such as from the memory component 143). The input/output hardware 142 may include any hardware and/or software for providing input to the robot 100 (or computing device), such as, without limitation a keyboard, mouse, camera, microphone, speaker, touch-screen, and/or other device for receiving, sending, and/or presenting data. The network interface hardware 146 may include any wired or wireless networking hardware, such as a modem, LAN port, wireless fidelity (Wi-Fi) card, WiMax card, mobile communications hardware, and/or other hardware for communicating with other networks and/or devices.

It should be understood that the memory component 143 may reside local to and/or remote from the robot 100 and may be configured to store one or more pieces of data for access by the robot 100 and/or other components. It should also be understood that the components illustrated in FIG. 3 are merely exemplary and are not intended to limit the scope of this disclosure. More specifically, while the components in FIG. 3 are illustrated as residing within the robot 100, this is a nonlimiting example. In some embodiments, one or more of the components may reside external to the robot 100, such as within a computing device that is communicatively coupled to one or more robots.

FIG. 3 also depicts a manipulation planning module 150 that is configured to filter unnatural grasp patterns from a grasp pattern set associated with a target object, and, in some embodiments, develop manipulator and end effector motion segments to move the robot in accordance with desirable grasp patterns from the grasp pattern set. The manipulation planning module 150 is shown as external from the robot 100 in FIG. 3, and may reside in an external computing device, such as a general purpose or application specific computer. However, it should be understood that all, some, or none of the components, either software or hardware, of the manipulation planning module 150 may be provided within the robot 100. For example, in an embodiment wherein the robot 100 evaluates all of the grasp patterns of a particular object in real-time, all of the components of the manipulation planning module 150 (see FIG. 4) may be provided in the robot 100 (e.g., as computer-executable instructions stored on the memory component 143). Alternatively, grasp pattern evaluation may be performed off-line and remotely from the robot 100 by a computing device such that only grasp patterns satisfying the requirements of the grasp pattern evaluations described herein are provided to the robot for use in manipulation planning. Further, motion planning within the manipulation planning module may also be performed off-line by an external computing device and provided to the robot 100. Alternatively, the robot 100 may determine motion planning using desirable grasp patterns provided by an external computing device. Components and methodologies of the manipulation planning module are described in detail below with reference to FIGS. 2, and 4.

Generally, a particular target object, such as the bottle depicted in FIGS. 1 and 2, may have a plurality of individual grasp patterns associated with it, wherein each individual grasp pattern represents a different approach of grasping the target object. The plurality of individual grasp patterns define a grasp pattern set associated with the object. Each individual grasp pattern may differ from other grasp patterns within the grasp pattern set in a variety of ways. For example, a first grasp pattern in the grasp pattern set may approach the target object from a first direction (i.e., a first approach ray), and a second grasp pattern in the grasp pattern set may approach the target object from a second direction (i.e., a second approach ray). Alternatively, the first grasp pattern and the second grasp pattern may approach the target from the same direction along the same approach ray, but may differ in orientation of the manipulator and/or end effector. There is no upper or lower bound to the number or type of individual grasp patterns within the grasp pattern set.

Embodiments of the present disclosure may evaluate some or all of the individual grasp patterns of the grasp pattern set to filter out (i.e., exclude) those grasp patterns that may lead to unnatural motion of the robot. Only those grasp patterns that yield natural motion will be provided to, or otherwise considered, by the robot during manipulation planning. Therefore, computation resources and time are saved during real-time processes because the robot may have fewer grasp patterns to evaluate.

According to one embodiment, a thumb-up vector is established with respect to an end effector that is to grasp or otherwise manipulate the target object. Referring once again to FIG. 2, the thumb-up vector V may extend perpendicularly from the top surface 111 of the hand portion 116. The direction of the thumb-up vector V throughout computer simulated motion of the manipulator 110 (e.g., upper arm component 112 and forearm component 114) and the end effector (e.g., the hand portion 116) in accordance with a selected individual grasp pattern of the grasp pattern set may be evaluated. If the direction of the thumb-up vector V is outside of one or more predetermined thresholds, it will be excluded from further consideration and will not be used by the robot. As an example and not a limitation, if a direction of the thumb-up vector V resulting from the selected individual grasp pattern may cause the target object 130 to be positioned upside-down, the selected individual grasp pattern may be filtered out and excluded from use by the robot 100 during manipulation planning. A selected individual grasp pattern having a thumb-up vector V that does not cause the target object 130 to be upside-down may be indicated as a valid grasp pattern candidate and therefore provided to robot 100 for use in manipulation planning.

It is noted that embodiments described herein result from computer simulation of the motions performed by the robot. However, it should be understood that the grasp pattern evaluation may also be determined by actual movement of a physical robot.

In one embodiment, the direction of the thumb-up vector V is evaluated by determining an end effector angle $\alpha$ that is measured between the thumb-up vector V and a vertical axis y extending from a base surface 107 of the robot. The vertical axis y points in a direction that is substantially vertical with respect to the surface that the robot 100 is located. The selected individual grasp pattern may be excluded from use by the robot if the end effector angle α is greater than a predetermined angle threshold during the simulated motion of the selected individual grasp pattern. Alternatively, the selected individual grasp pattern may be indicated as a grasp pattern candidate if the end effector angle α is less than the predetermined angle threshold. The predetermined angle threshold may be a discrete angle, or may be an angle range. Additionally, the predetermined angle threshold may be different for different target objects. As an example and not a limitation, the predetermined angle threshold for a coffee cup may be a range that is smaller than a range associated with a television remote control.

In one embodiment, the thumb-up vector V may be established by monitoring a position the thumb joint 119' with respect to one or more of the finger joints 119. The selected individual grasp pattern may be filtered out of the grasp pattern set and excluded from use by the robot if the thumb joint 119' is positioned at a location that is lower along a vertical axis y than each of the other finger joints 119. In this instance, there is a high likelihood that the selected individual grasp pattern may tip the target object at an extreme angle, which may look unnatural to an observer of the robot 100. However, the selected individual grasp pattern may be indicated as a grasp pattern candidate if the thumb joint is higher than or level with at least one of the finger joints during the simulated motion of the grasp pattern.

In another embodiment, the position of the elbow 113 of the robot 100 may be evaluated in filtering out unnatural grasp patterns from the grasp pattern set. When the elbow 113 of the robot 100 is above a predetermined height h in a selected grasp pattern as shown in FIG. 1, the selected grasp pattern may be deemed unnatural or unstable and excluded from use by the robot 100. Conversely, when the elbow 113 of the robot 100 is below the predetermined height h in a selected grasp pattern as shown in FIG. 2, the selected grasp pattern may be indicated as a grasp pattern candidate and made available to the robot 100. The predetermined height h may be different for different target objects. Further, the predetermined height for the unstable determination may be different from the predetermined height for the stable determination. The elbow analysis may be used separately or concurrently with the thumb-up vector analysis when evaluating the individual grasp patterns of the grasp pattern set.

Figure 4:
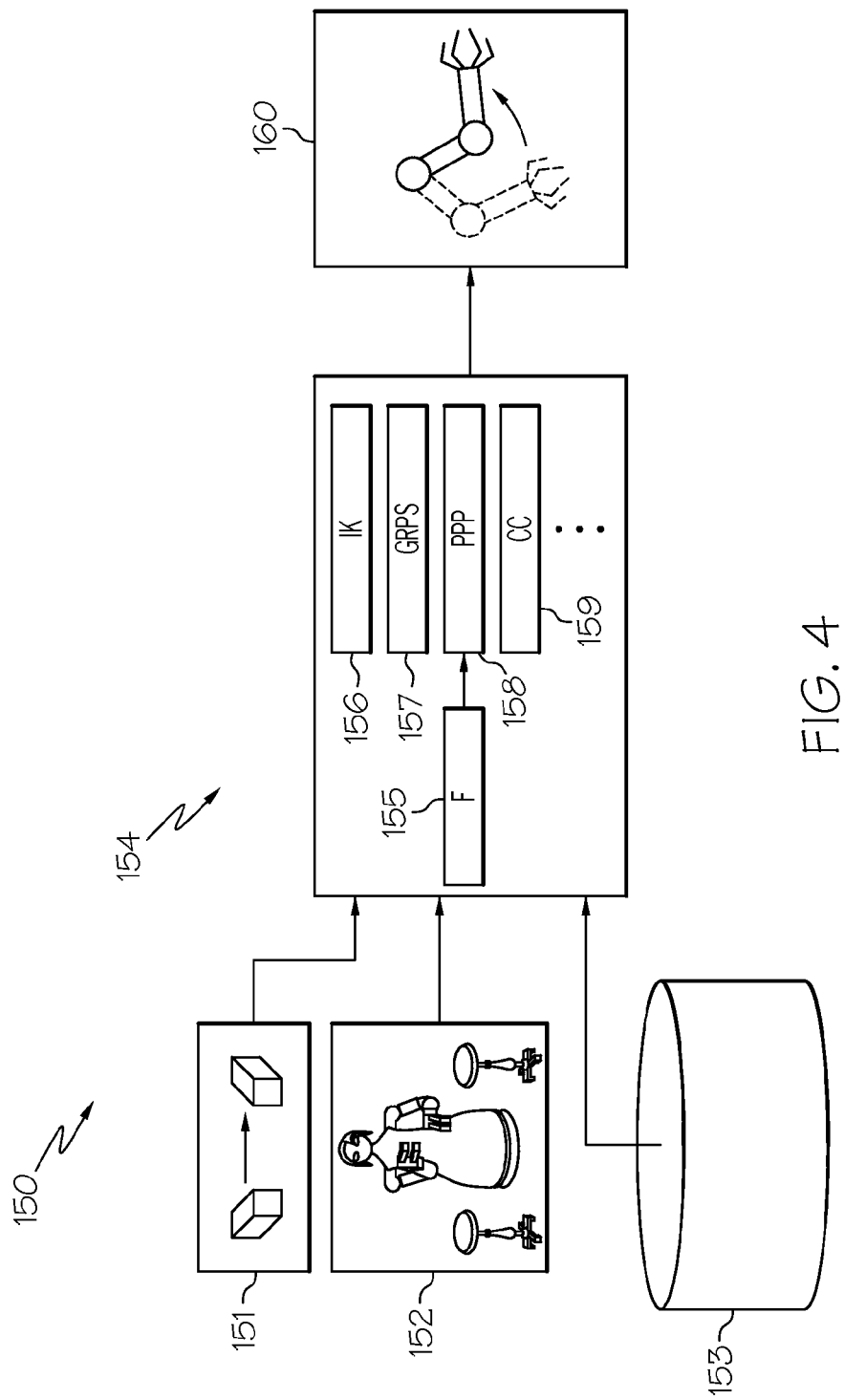
FIG. 4 depicts a schematic illustration of a block diagram grasp representing manipulation planning according to one or more embodiments shown and described herein.

Referring now to FIG. 4, a block diagram representing manipulation planning components of a manipulation planning module 150 according to one embodiment is schematically illustrated. It should be understood that the individual components of the manipulation planning module 150 may be performed by the robot 100 or an external computing device, as described above. Further, embodiments are not limited to the order of which the individual components of the manipulation planning module 150 are depicted in FIG. 4.

The manipulation planning module 150 generally comprises a manipulation planning block 154 that receives inputs regarding the initial pose and the target pose of the target object to be manipulated (block 151), an online input providing online input such as the current pose of the robot (block 152), and offline input providing information such as a computer model of the robot (block 153), a computer model of the target object, the raw grasp pattern set with respect to the target object, a computer model of obstacles that may be present, and other data.

The manipulation planning block 154 receives the aforementioned inputs and generates output commands for the robot in the form of motion sequences that are provided to the actuators of the robot to control the robot to perform the desired tasks (block 160). Components of the manipulation planning block 154 may include, but are not limited to, an inverse kinematics module 156, a grasp pattern selector module 157, a thumb-up filter module 155, a motion planner module 158, and a collision checker module 159. More or fewer modules or components may be included in the manipulation planning block 154.

The inverse kinematics module 156 computes a set of manipulator joint angles for a given set of Cartesian positions of the end-effector resulting from a grasp pattern and/or further manipulation of the target object. In one embodiment, the inverse kinematics module 156 computes a set of manipulator joint angles for all possible grasping patterns of the raw grasp pattern set. In another embodiment, the inverse kinematics module 156 computes a set of manipulator joint angles for a sub-set of the grasp pattern set.

The grasp pattern selector module 157 may be optionally provided to filter out non-optimal grasp patterns out of the raw grasp pattern set. The grasp pattern selector module 157 may ensure that only those grasp patterns of the grasp pattern set that enable the robot to successfully grasp the target object are passed on to further processes, such as the thumb-up filter module 155, for example. As an example and not a limitation, the grasp pattern selector module 157 may be configured to filter out grasp patterns that cause the end effector of the robot to collide with the target object and not allow a successful grasp of the target object.

The thumb-up filter module 155 performs the filtering tasks described above wherein individual grasp patterns of the grasp pattern set (e.g., the raw grasp pattern set or a grasp pattern set that has been filtered by the optional grasp pattern selector module 157) that lead to unnatural movements of the robot are removed from the grasp pattern set. In one embodiment, the thumb-up filter module 155 is applied after application of the grasp pattern selector module 157. Individual grasp patterns remaining in the grasp pattern set after application of the thumb-up filter module 155 may then be made available to the robot for further consideration during online manipulation of the target object.

The motion planner module 158 may be utilized to plan how the robot will grasp the target object, how it will be moved, and how it will be placed at a target location. In one embodiment, the motion planner module 158 utilizes a rapidly-exploring random tree (RRT) algorithm to develop optimized motion or manipulation plans. Other algorithms are also possible for motion and/or manipulation planning. In one embodiment, the motion planner module 158 may consider some or all of the individual grasp patterns that have been passed from the thumb-up filter module 155, and may pick the individual grasp pattern that provides for optimum manipulation of the target object.

The collision checker module 159 computes and checks whether the planned motion of the manipulator and end effector motion will cause the robot to collide with surrounding obstacles that may be present within the operating space. In one embodiment, if the collision checker module 159 determines that planned motion will cause a collision, the motion planner module 158 may be called to alter the planned motion of the manipulator and end effector to avoid the obstacle(s).

It should now be understood that the embodiments of the present disclosure enable a robot to perform object manipulations in a more natural, human-like manner that may be more pleasing to observers of the robot. Robots using the thumb-up filter and other methods described herein grasp the target object with a top surface of its hand facing substantially upward, and with its elbow relatively low and close to its body, similar to how a human would grasp an object. Such a grasping motion may be not only pleasing to an observer, it may also prevent unnecessary spilling of contents that may be contained in the target object. Embodiments allow a robot to choose natural grasping patterns automatically without requiring extensive programming and teaching because undesirable unnatural grasp patterns are excluded without operator intervention.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of evaluating individual grasp patterns of a grasp pattern set for use by a robot, the method comprising:
    selecting an individual grasp pattern from the grasp pattern set, wherein each individual grasp pattern of the grasp pattern set corresponds to a motion of a manipulator and an end effector of the robot for manipulating a target object;
    establishing, using a processor, a thumb-up vector extending from a top surface of the end effector;
    simulating, using the processor, the motion of the manipulator and the end effector according to the selected individual grasp pattern;
    evaluating, using the processor, a direction of the thumb-up vector during at least a portion of the simulated motion of the manipulator and the end effector;
    excluding, using the processor, the selected individual grasp pattern from use by the robot if the direction of the thumb-up vector during the simulated motion is outside of one or more predetermined thresholds;
    indicating the selected individual grasp pattern as a grasp pattern candidate if the direction of the thumb-up vector during the simulated motion is within the one or more predetermined thresholds; and
    providing a plurality of grasp pattern candidates to a motion planner module of the robot; and
    manipulating the target object by the robot based on at least one grasp pattern candidate of the plurality of grasp pattern candidates.

2. The method of claim 1, wherein the direction of the thumb-up vector is evaluated by determining an end effector angle between the thumb-up vector and a vertical axis extending from a base surface of the robot.

3. The method of claim 2, wherein the selected individual grasp pattern is excluded from use by the robot if the end effector angle is greater than a predetermined angle threshold during the simulated motion, and the selected individual grasp pattern is indicated as a grasp pattern candidate if the end effector angle is less than the predetermined angle threshold during the simulated motion.

4. The method of claim 1, wherein:
    the end effector of the robot comprises a thumb joint and at least two finger joints;
    the thumb-up vector is established by determining a position of the thumb joint with respect to the at least two finger joints;
    the selected individual grasp pattern is excluded from use by the robot if the thumb joint is lower along a vertical axis extending from a base surface of the robot than each of the at least two finger joints during the simulated motion; and
    the selected individual grasp pattern is indicated as a grasp pattern candidate if the thumb joint is higher than or level with at least one of the at least two finger joints during the simulated motion.

5. The method of claim 4, wherein:
    the thumb-up vector is further established by determining a position of an elbow of the manipulator;
    the selected individual grasp pattern is excluded from use by the robot if the thumb joint is lower along the vertical axis than each of the at least two finger joints during the simulated motion, or if the position of the elbow exceeds a predetermined height along the vertical axis during the simulated motion; and
    the selected individual grasp pattern is indicated as a grasp pattern candidate if the thumb joint is higher than or level with at least one of the at least two finger joints during the simulated motion, and if the position of the elbow is below the predetermined height along the vertical axis during the simulated motion.

6. A computer-program product for use with a computing device for evaluating individual grasp patterns of a grasp pattern set for use by a robot, the computer-program product comprising:
    a non-transitory computer-readable medium storing computer-executable instructions for evaluating grasp patterns that, when executed by the computing device, cause the computing device to:
        select an individual grasp pattern from the grasp pattern set, wherein each individual grasp pattern of the grasp pattern set corresponds to a motion of a manipulator and an end effector of the robot for manipulating a target object;
        establish a thumb-up vector extending from a top surface of the end effector;
        simulate the motion of the manipulator and the end effector according to the selected individual grasp pattern;
        evaluate a direction of the thumb-up vector during at least a portion of the simulated motion of the manipulator and the end effector;
        exclude the selected individual grasp pattern from use by the robot if the direction of the thumb-up vector during the simulated motion is outside of one or more predetermined thresholds;
        indicate the selected individual grasp pattern as a grasp pattern candidate if the direction of the thumb-up vector during the simulated motion is within the one or more predetermined thresholds; and
        provide a plurality of grasp pattern candidates to a motion planner module of the robot; and
        manipulate the target object by the robot based on at least one grasp pattern candidate of the plurality of grasp pattern candidates.

7. The computer-program product of claim 6, wherein the direction of the thumb-up vector is evaluated by determining an end effector angle between the thumb-up vector and a vertical axis extending from a base surface of the robot.

8. The computer-program product of claim 7, wherein the selected individual grasp pattern is excluded from use by the robot if the end effector angle is greater than a predetermined angle threshold during the simulated motion, and the selected individual grasp pattern is indicated as a grasp pattern candidate if the end effector angle is less than the predetermined angle threshold during the simulated motion.

9. The computer-program product of claim 6, wherein:
the end effector of the robot comprises a thumb joint and at least two finger joints;
the thumb-up vector is established by determining a position of the thumb joint with respect to the at least two finger joints;
the selected individual grasp pattern is excluded from use by the robot if the thumb joint is lower along a vertical axis extending from a base surface of the robot than each of the at least two finger joints during the simulated motion; and
the selected individual grasp pattern is indicated as a grasp pattern candidate if the thumb joint is higher than or level with at least one of the at least two finger joints during the simulated motion.

10. The computer-program product of claim 9, wherein:
the thumb-up vector is further established by determining a position of an elbow of the manipulator;
the selected individual grasp pattern is excluded from use by the robot if the thumb joint is lower along the vertical axis than each of the at least two finger joints during the simulated motion, or if the position of the elbow exceeds a predetermined height along the vertical axis during the simulated motion; and
the selected individual grasp pattern is indicated as a grasp pattern candidate if the thumb joint is higher than or level with at least one of the at least two finger joints during the simulated motion, and if the position of the elbow is below the predetermined height along the vertical axis during the simulated motion.

11. A robot comprising:
a base portion comprising a base surface;
a manipulator movably coupled to the base portion;
an end effector movably coupled to a distal end of the manipulator;
a processor;
a computer-readable medium storing computer-executable instructions for evaluating grasp patterns that, when executed by the processor, cause the processor to:
receive one or more grasp pattern candidates, wherein the one or more grasp pattern candidates are determined by:
selecting an individual grasp pattern from a grasp pattern set, wherein each individual grasp pattern of the grasp pattern set corresponds to a motion of the manipulator and the end effector of the robot for manipulating a target object;
establishing a thumb-up vector extending from a top surface of the end effector;
simulating the motion of the manipulator and the end effector according to the selected individual grasp pattern;
evaluating a direction of the thumb-up vector during at least a portion of the simulated motion of the manipulator and the end effector; and
excluding the selected individual grasp pattern from use by the robot if the direction of the thumb-up vector during the simulated motion is outside of one or more predetermined thresholds;
select one of the one or more grasp pattern candidates and provide the selected grasp pattern candidate to a motion planner module;
generate a plurality of motion segments corresponding to the base portion, the manipulator, the end effector or combinations thereof; and
control the base portion, the manipulator, or the end effector according to the plurality of motion segments.

12. The robot of claim 11, wherein the one or more grasp pattern candidates are determined by the robot using the computer-executable instructions and the processor.

13. The robot of claim 11, wherein the one or more grasp pattern candidates are provided to the robot by an external computing device.

14. The robot of claim 11, wherein the direction of the thumb-up vector is evaluated by determining an end effector angle between the thumb-up vector and a vertical axis extending from the base surface of the robot.

15. The robot of claim 14, wherein the selected individual grasp pattern is excluded from use by the robot if the end effector angle is greater than a predetermined angle threshold during the simulated motion, and the selected individual grasp pattern is indicated as an individual grasp pattern candidate if the end effector angle is less than the predetermined angle threshold during the simulated motion.

16. The robot of claim 11, wherein:
the end effector of the robot comprises a thumb joint and at least two finger joints;
the manipulator comprises an elbow;
the thumb-up vector is established by determining a position of the thumb joint with respect to the at least two finger joints and determining a position of the elbow of the manipulator;
the selected individual grasp pattern is excluded from use by the robot if the thumb joint is lower along a vertical axis extending from a base surface of the robot than each of the at least two finger joints during the simulated motion, or if the position of the elbow exceeds a predetermined height along the vertical axis during the simulated motion; and
the selected individual grasp pattern is indicated as an individual grasp pattern candidate if the thumb joint is higher than or level with at least one of the at least two finger joints during the simulated motion, and if the position of the elbow is below the predetermined height along the vertical axis during the simulated motion.

* * * * *